United States Patent
Bachle et al.

[11] 3,730,564
[45] May 1, 1973

[54] TAPERED COMPRESSION END FITTING

[75] Inventors: Wilfred H. Bachle, Long Beach; Gilbert Segovia, Santa Ana; H. Andre Parker-Jones, Newport Beach, all of Calif.

[73] Assignee: Philco-Ford Corporation, Philadelphia, Pa.

[22] Filed: Nov. 15, 1971

[21] Appl. No.: 198,658

[52] U.S. Cl. ................ 285/115, 285/249, 285/259
[51] Int. Cl. ............................................. F16l 33/20
[58] Field of Search .................. 285/249, 248, 259, 285/341, 343, 115

[56] References Cited

UNITED STATES PATENTS

| 3,606,396 | 9/1971 | Pvosdocima et al. | 285/249 X |
| 2,423,632 | 7/1947 | Ansovge | 285/249 X |
| 145,731 | 12/1873 | Edson | 285/248 X |
| 2,430,921 | 11/1947 | Edelmann | 285/259 X |

FOREIGN PATENTS OR APPLICATIONS

| 809,097 | 2/1959 | Great Britain | 285/249 |
| 453,819 | 6/1968 | Switzerland | 285/249 |
| 1,008,313 | 10/1965 | Great Britain | 285/249 |
| 1,068,069 | 10/1959 | Germany | 285/248 |

Primary Examiner—Thomas F. Callaghan
Attorney—Robert D. Sanborn

[57] ABSTRACT

This invention describes a unique end fitting for use with a single or multi-layer, braid-covered cast membrane tube of the type used in reverse osmosis fluid separation systems and the like. It can be used as a coupling between dissimilar tubing or two tubes of like characteristics.

1 Claim, 4 Drawing Figures

PATENTED MAY 1 1973

3,730,564

INVENTORS
WILFRED H. BACHLE
GILBERT SEGOVIA
BY H. ANDRE PARKER-JONES

BY Keith L. Zerschling
Thomas H. Oster
ATTORNEYS

TAPERED COMPRESSION END FITTING

THE INVENTION

The development of a connector usable with a braid supported tubular membrane for use in a reverse osmosis system involves the solution of several problems.

For instance, the modified cellulose acetate membrane is thin and fragile. The membrane thickness can vary from 4 to 12 mils and must currently be maintained in a wet state during its fabrication and integration with a pressure support.

The membrane for which the connector hereafter described was invented is supported by a braided covering of polyester fibers which can sustain no shear forces. A cut end will tend to unravel or come apart if handled before it is captured by the end fitting. The braid covered membrane is kept wet when the fitting is attached.

In addition, the membrane is susceptible to damage by most solvents used in elastomeric sealants or resin systems; thus, sealing and structural strength must be achieved by mechanical means only.

In some applications the product fluid is intended for human consumption. This implies that the materials used must not contaminate the product water and must be compatible with the FDA requirements.

The connector must seal and maintain structural integrity at fluid pressures of up to 1500 psig. Even higher pressure containment is useful in some applications.

Early laboratory connector concepts provided a separate structural attachment to the braided covering in which the braid was clamped between a male and female part of the end fitting. The membrane was passed through the connector and a fluid seal was achieved at some point other than the point at which the structural joint between the connector and the braid was made. This concept proved to operate successfully when used on small diameter membranes; i.e., a quarter-inch diameter membrane. It did not lend itself to successful use with one-inch diameter membranes for the following reasons:

a. It is necessary to loosen the weave of the braid to provide the required flare at the end of the braided sheath to allow insertion of the male part of the connector. Because of the larger number of braid yarns per inch and the increased number of yarn crossover points, this flaring could not be uniformly accomplished in the larger sizes to the degree necessary without destroying the structural coherence of the braid.

b. A small, unsupported circumferential area of membrane occurs at the point at which the membrane support is transferred from the flexible braid to the end fitting. This is due to the finite thickness required in the wall of the end fitting in order that it be amenable to fabrication processes and to the relatively large differences in rigidity of the two structures. This area of nonsupport, or inadequate support, allows excessive elongation of the membrane under pressure resulting in degraded performance and a high probability of rupture; also the assembly process for this laboratory type connector is time consuming and requires a high level of skill in the person performing the assembly. Neither of these facts are compatible with the production requirements for rapid and reliable assembly with relatively unskilled labor.

To eliminate such problems as are described above, a new and unique connector for use as a coupling between a multi-layer braided membrane tube and an orthodox metal or plastic tube or plug has been invented, and it is an object of the present invention, therefore, to provide a connector suitable for leakproof use with a braid-covered tube where the tube itself has very little mechanical strength.

A further object of the invention is to provide a leakproof coupling means without the use of elastomeric sealants or the like, and for the coupling to be re-usable.

Another object of this invention is to provide a connector the parts of which can be mass-produced by well-known methods on orthodox equipment, and within commercially acceptable dimensional tolerances.

It is yet another object of the invention to provide a connector which requires no high degree of skill to achieve a satisfactory assembly.

Other objects will be apparent to those skilled in this particular art after a reading of the description and a study of the drawings where FIG. 1 is a cross section of the connector parallel to the axis of the tubes.

Figure 1:
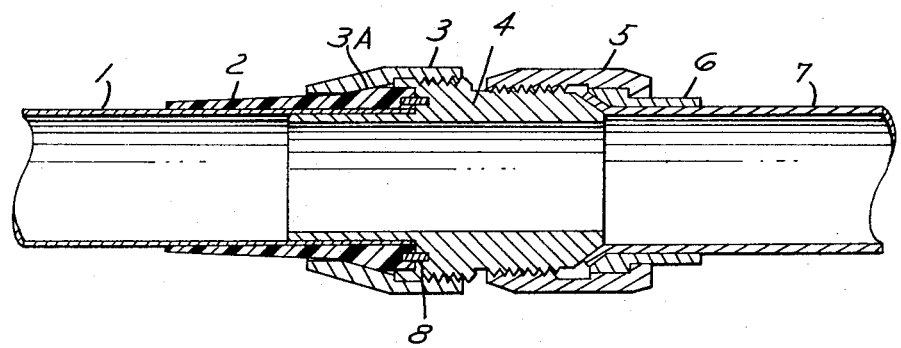

Referring now to FIG. 1 in order to provide a better understanding of the unique features of the invention it will be seen that fitting and tubes are assembled by first passing the braid-covered membrane tube 1 through the metal compression nut 3 and the plastic sleeve 2. The polyester braid-covered membrane tube 1 is then trimmed flush with the end of the said plastic sleeve 2. The male extension of the end fitting 4 is next inserted into the braid-covered membrane tube 1 and pin-receiving holes are aligned with holding pins 8 to prevent rotary movement between said plastic sleeve 2 and said end fitting 4. One or more holding pins with matching holes can be used.

Referring again to the compression nut 3 it will now be apparent that by engaging said nut onto the cooperating threaded portion of end fitting 4 the application of sufficient torque will compress the sleeve 2 by virtue of the cam effect imparted by the angular contact at point 34 which compression in turn will close the braid covered tube 1 tightly onto the outside diameter of the male extension of the end fitting 4.

Figure 2:
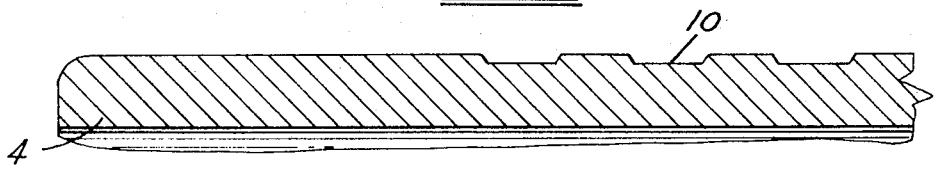
FIG. 2 is an enlarged view of the groove detail in end fitting 4 shown also in FIG. 1.

It has been found that improved sealing between the braided tube 1 and the extension of end fitting 4 can be obtained if the outer diameter of the said extension is first prepared by hydro-honing. Hydro-honing is known in the art as a process similar to sandblasting and is a process in which glass beads are carried in a jet of water to impact on and finely abraid a surface. In addition to hydro-honing, the outer diameter of the extension is grooved with a plurality of grooves approximately 5 mils deep as best shown in greatly exaggerated form in FIG. 2 at 10 and it has been found that with such a lightly grooved surface the fibers of the braid and the membrane tube are better gripped and thus better able to resist forces tending to pull them from the end fitting.

Figure 3:
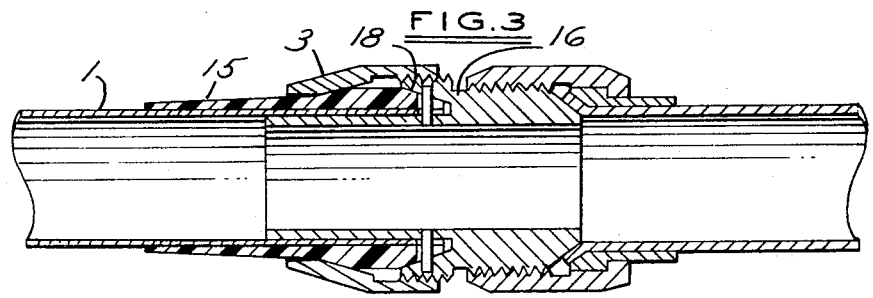
FIG. 3 is a modification of the structure of FIG. 1.

Refer now to FIG. 3 and in particular to the plastic sleeve 15 and to the end fitting 16. It has been found advisable when the fittings are used on very high pressure desalinization systems, for instance on systems operating at pressures of 1,200 psig, to increase the compression area and also the grip of the plastic sleeve 15 to avoid an inadvertent "pull-out" of braid reinforcing covering on the membrane tube.

Figure 4:
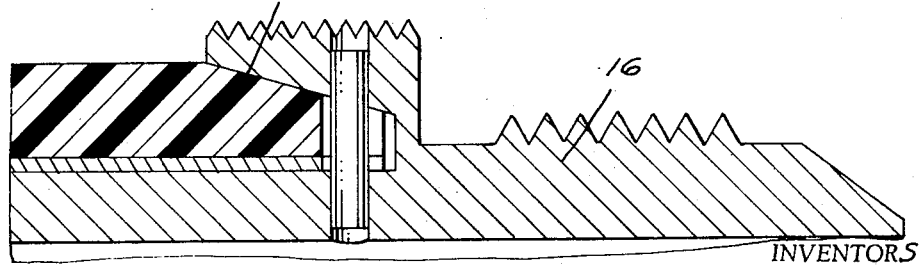
FIG. 4 is an enlarged sectional view of a portion of FIG. 3.

This is accomplished by means of an extra angular contact between the end of the plastic sleeve 15 and the internal angular surface illustrated in FIGS. 3 and 4 at 18.

While the invention has been described herein with particular reference to certain preferred embodiments thereof it will be apparent that various modifications and other embodiments will occur to those skilled in the art within the scope of this invention. Accordingly, we desire the scope of our invention to be limited only to the claims appended herebelow.

We claim as our invention:

1. A high pressure resistant coupling for establishing a connection between a braided fiber reinforced plastic membrane tube having a wall thickness in the range of 4 to 12 mils and a further connecting member, said coupling comprising a plastically deformable sleeve, a compression nut, an end fitting and means for preventing relative rotation between the plastically deformable sleeve and the end fitting, said end fitting being sized for a portion of its length adjacent one end to be received within the inner diameter of the terminal portion of the reinforced plastic membrane tube and having a roughened surface provided with circumferential grooves about 0.005 inches deep, being threaded externally at a location intermediate its length to engage a compression nut, being formed with an internal tapered surface spaced radially outwardly from said sized portion and being fitted to engage means for preventing relative rotation between the plastically deformable sleeve and the end fitting, said plastically deformable sleeve being contoured to enclose the terminal portion of the reinforced plastic membrane tube, having a portion of its external surface tapered with the larger diameter being toward the threaded portion of the end fitting and engaging said internal tapered surface, being fitted to engage the means for preventing rotation between the end fitting and the plastically deformable sleeve and having an intermediate tapered section to assist in compressing the plastically deformable sleeve against the fiber reinforced plastic membrane tube, said compression nut being internally threaded to receive the threaded portion of the end fitting and having a tapered portion remote from said internally threaded portion which tapered portion is adjacent to and complementary to said intermediate tapered portion of the plastically deformable sleeve, said means for preventing relative rotation between the plastically deformable sleeve and the end fitting being a pin inserted radially in matching openings in the plastic deformable sleeve and the end fitting said sleeve having a length substantially greater than said nut.

* * * * *